United States Patent [19]

Louboutin et al.

[11] Patent Number: 4,579,655
[45] Date of Patent: Apr. 1, 1986

[54] APPARATUS FOR TREATING WATER BY FLOCCULATION AND/OR CRYSTALLINE PRECIPITATION, SETTLING AND SLUDGE RECYCLING

[75] Inventors: Robert Louboutin, Crespieres; Patrick Vion, Houilles, both of France

[73] Assignee: Degremont, Hauts de Seine, France

[21] Appl. No.: 657,014

[22] Filed: Oct. 2, 1984

[30] Foreign Application Priority Data

Oct. 7, 1983 [FR] France ............................ 83 15977

[51] Int. Cl.$^4$ ............................................ B01D 21/08
[52] U.S. Cl. ................................ 210/195.3; 210/197; 210/202; 210/208; 210/522
[58] Field of Search ................ 210/713, 802, 195.3, 210/197, 200–202, 205–208, 521, 522, 528

[56] References Cited

U.S. PATENT DOCUMENTS

| | | | |
|---|---|---|---|
| 2,296,437 | 9/1942 | Green | 210/713 |
| 3,306,449 | 2/1967 | Minegishi | 210/195.3 |
| 3,397,788 | 8/1968 | Duff et al. | 210/195.3 |
| 4,111,802 | 5/1978 | Louboutin et al. | 210/738 |
| 4,136,012 | 1/1979 | Louboutin et al. | 210/208 |
| 4,200,534 | 4/1980 | Besik | 210/199 |
| 4,290,898 | 9/1981 | von Hagel et al. | 210/208 |
| 4,367,145 | 1/1983 | Simpson et al. | 210/241 |
| 4,388,195 | 6/1983 | von Hagel et al. | 210/738 |

FOREIGN PATENT DOCUMENTS

| | | |
|---|---|---|
| 0052245 | 5/1982 | European Pat. Off. . |
| 2752296 | 5/1979 | Fed. Rep. of Germany ...... 210/197 |
| 2156277 | 5/1973 | France . |
| 2345396 | 10/1977 | France . |
| 2348156 | 11/1977 | France . |
| 2364860 | 4/1978 | France . |
| 2050185 | 1/1981 | United Kingdom . |
| 1583990 | 2/1981 | United Kingdom . |

*Primary Examiner*—Peter Hruskoci
*Attorney, Agent, or Firm*—Wenderoth, Lind & Ponack

[57] ABSTRACT

An apparatus for the treatment of water to remove colloidal and suspended matter therefrom includes a reaction tank for receiving water to be treated and for forming sludge of flocculated or crystalline precipitated matter contained in the water. A concentrating tank receives the water and sludge from the reaction tank, removes sludge and matter from the water, and concentrates the sludge. A lamella settling tank receives from the concentrating tank the water and removes therefrom by settling remaining sludge and matter. A portion of the sludge from the concentrating tank prior to the maximum concentration thereof is recycled to the reaction tank.

9 Claims, 2 Drawing Figures

APPARATUS FOR TREATING WATER BY FLOCCULATION AND/OR CRYSTALLINE PRECIPITATION, SETTLING AND SLUDGE RECYCLING

BACKGROUND OF THE INVENTION

The present invention relates to an apparatus for the treatment of water to remove therefrom colloidal and suspended matter by flocculation and/or crystalline precipitation, followed by lamella settling to achieve separation of sludges formed by settling, concentrating or thickening, and recirculation or recycling of a portion of the sludge after concentration thereof.

The present invention is directed to such an apparatus applicable to the treatment of all types of water, for example surface water charged with colloidal and suspended matter, waste water, and particularly advantageously to water loaded with mineral soils that can be precipitated in the form of crystalline sludge by a reagent, for example such as lime.

In French Pat. No. 76.08442 there is disclosed an apparatus for the treatment of water by recirculation, precipitation and separation of sludges formed. The apparatus includes in the same enclosure two zones, i.e. a reaction zone, for example for coagulation, flocculation or crystalline precipitation, and another zone for lamella settling. The two zones are in communication along the width of the apparatus and allow an internal recirculation or recycling of a portion of the sludge formed.

A number of other devices have been known, for example from French Pat. No. 76.37544, including a flocculator and a lamella settling tank with recirculation or recycling of sludge from the settling tank to the flocculator by means of a hydroejector.

However, very often the factor limiting capacity of these types of devices is not the settling velocity, but the volume of sludge produced during treatment. Moreover, the correct operation of these types of devices is conditioned upon the maintenance in the reaction/flocculation zone of an appropriate concentration of sludge supplied by the recirculation or recycling flow. The attainment of such a concentration become problematic beyond a particular flow rate of the water to be treated corresponding to a settling velocity which is lower than that theoretically possible in the lamella settling zone.

Indeed, to each increase of the settling velocity and therefore of the flow rate of the water being treated in an apparatus of particular dimensions, there corresponds a proportional increase of sludge production. Since the volume available below the modules of the lamella settling tank for the storage of such sludges cannot vary, it follows that it is impossible, without risking clogging of the apparatus, to comply with the requirement of an adequate detention time below the lamella modules to ensure thickening of the sludge to obtain, on the one hand, the proper concentration of sludge in the recycling flow, and on the other hand, the maximum possible concentration in the flow of sludge withdrawn from the apparatus.

Deepening or increasing the height of the apparatus in order to provide a sufficient volume below the lamella modules for storage and thickening of the sludge does not solve the problem, since the capacity of the apparatus then continues to be limited by the maximum possible value of the horizontal circulation flow which, in order to maintain the required sludge concentration in the flocculation and reaction tank, must be adapted to the flow rate of the volume of water being treated. It has been determined that, starting from a particular value of this recirculation flow corresponding to a treatment flow rate and thus to a settling velocity well below that allowed by the presence of the lamella modules, turbulent flow results below the lamella modules. This leads to an unacceptable deterioration of the quality of the treated water.

SUMMARY OF THE INVENTION

With the above discussion in mind, it is an object of the present invention to provide an apparatus for treating water by flocculation and/or crystalline precipitation, settling and sludge recycling, whereby it is possible to overcome the above and other prior art disadvantages.

It is a further object of the present invention to provide such an apparatus whereby it is possible to increase the settling velocity in the lamella settling zone or tank and to increase the concentration of withdrawn sludge.

It is another object of the present invention to provide such an apparatus whereby it is possible to improve the quality of the treated water.

It is a yet further object of the present invention to provide such an apparatus which enables operation at a flow rate corresponding to the maximum settling velocity allowed by the lamella modules, due to the attainment of large and dense floccules or precipitates with a high settling velocity, and to the elimination of a horizontal recirculation or recycling flow of the sludge in the area beneath the lamella modules.

The above and other objects are achieved in accordance with the present invention by the provision of an apparatus including a reaction tank for receiving water to be treated and for forming sludge of flocculated or crystalline precipitated matter contained in the water, a concentrating tank for receiving the water and sludge from the reaction tank, for removing sludge and matter from the water, and for thickening and concentrating the sludge, a lamella settling tank for receiving from the concentrating tank the water and for removing therefrom by settling remaining sludge and matter, means for removing treated water from the lamella settling tank, means for recycling to the reaction tank a portion of the sludge from the concentrating tank prior to the maximum concentration therein of the sludge, and means for removing concentrated sludge from the concentrating tank. Thus, in accordance with the present invention there is provided, preferably in a single enclosure, a plurality of tanks, with the concentrating tank being positioned between the reaction tank and the lamella settling tank. The sludge recycled from the concentrating tank may be in conjunction with or not sludge withdrawn from the lamella settling tank.

The reaction tank includes a first zone for receiving the water to be treated and for achieving mixing of the water with the recycled sludge, and a second zone connected to the first zone for flocculating or crystalline precipitating sludge from the water. The second zone is connected to the concentrating tank for transferring thereto the water and sludge. The first zone is defined by two coaxial enclosure members, the second zone is in the form of compartments on opposite sides of the first zone, and the first and second zones are connected to each other at adjacent lower ends thereof. The compartments are connected at upper ends thereof to the concentrating tank. The two enclosure members comprise an inner, preferably cylindrical, member and an outer member preferably of a parallelepipedal shape. The water to be treated and recycled sludge is introduced into a lower portion of the inner cylindrical member. A device such as a turbine or impeller is positioned within the inner cylindrical member to induce a flow of water to be treated and recycled sludge upwardly through the inner cylindrical member and then downwardly through a space between the inner and outer members, at a flow rate several times faster than the rate of introduction into the inner cylindrical member of the water to be treated. This provides a strong circulation of the water-recycled sludge mixture between the two enclosure members. Preferably, the circulation flow of the water-sludge mixture is from two to ten times the rate of introduction into the inner cylindrical member of the water to be treated. The lateral compartments of the second zone serve to enlarge and increase the density of the floccules whose concentration is maintained at approximately 0.5 to 10.0 g/l, depending on whether a flocculation treatment or a crystalline precipitation treatment is involved, due to the introduction into the raw water to be treated of recycled sludge from the concentration tank.

In accordance with the present invention, the concentrating tank includes two zones, namely an upper zone for the passage therethrough of water from the reaction tank to the lamella settling tank, and a lower zone for thickening and concentration of collected sludge. The lower zone may include a sludge collector, for example equipped with a conventional device such a rake or scraper, to increase the concentration of the sludge. The provision of the intermediate concentrating tank makes it possible to eliminate 85 to 90% of the particles or matter suspended in the water issuing from the reaction tank. Moreover, the provision of the intermediate concentrating tank makes it possible to achieve a sludge concentration at the lowest point of the intermediate tank of from 80 to 100 g/l in the case of a flocculation treatment, and 300 to 500 g/l in the case of a crystalline precipitation treatment.

Further in accordance with the present invention, the concentrating tank has a conduit extending therefrom to recycle a portion of the sludge. This arrangement makes it possible to obtain an optimum desired concentration of the recycled sludge. The conduit removes sludge from the concentrating tank at a position of from one-third to one-half of the height of the tank, measured from the bottom thereof. The conduit may be connected either to the suction side of a recycling pump or an ejection nozzle, disposed in a conduit for supplying to the reaction tank the raw water to be treated.

The lamella settling tank may have at least one pit for the collection of sludge, and this sludge may be withdrawn from the pit and either discharged or have a portion thereof recycled to the reaction tank along with the sludge recycled thereto from the concentrating tank.

BRIEF DESCRIPTION OF THE DRAWINGS

Other objects, features and advantages of the present invention will be apparent from the following description of a preferred and nonlimiting example thereof, and with reference to the accompanying drawings, wherein.

DETAILED DESCRIPTION OF THE INVENTION

Figure 1:
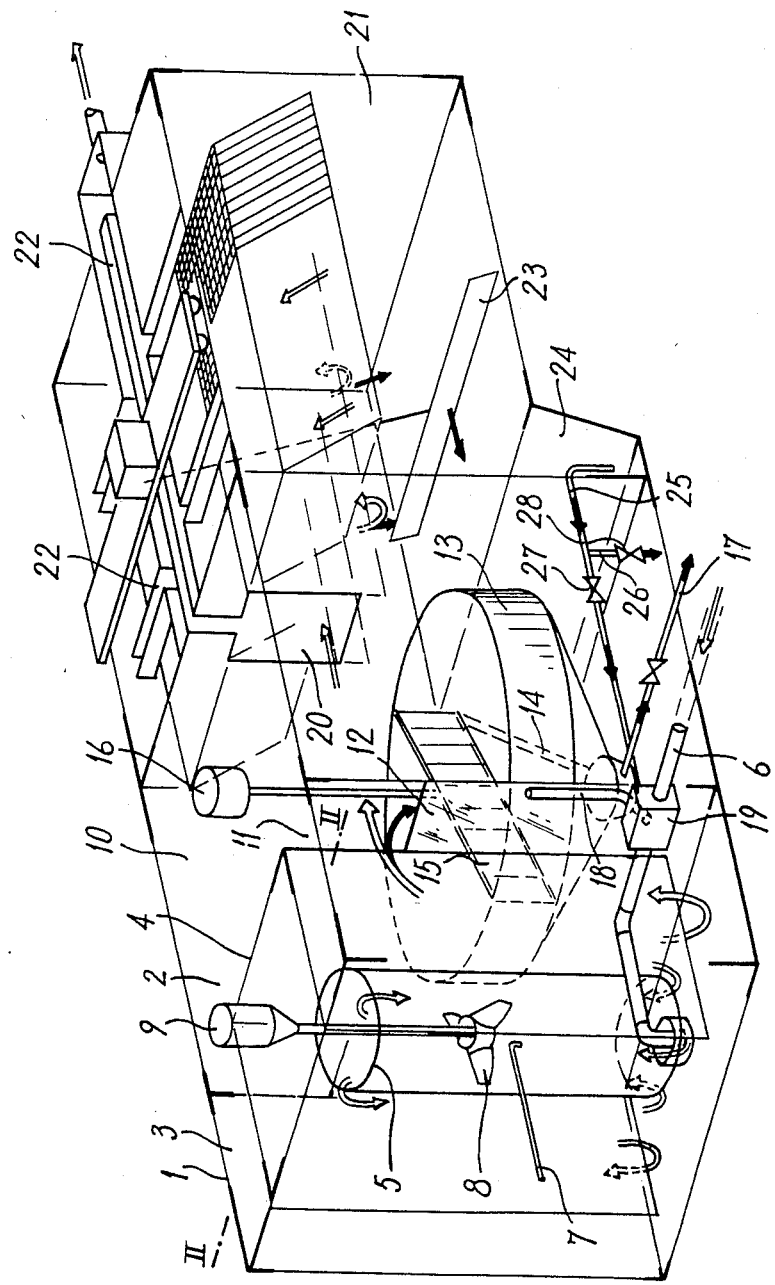
FIG. 1 is a perspective schematic view, portions of which are broken away, of one embodiment of the present invention.
Figure 2:
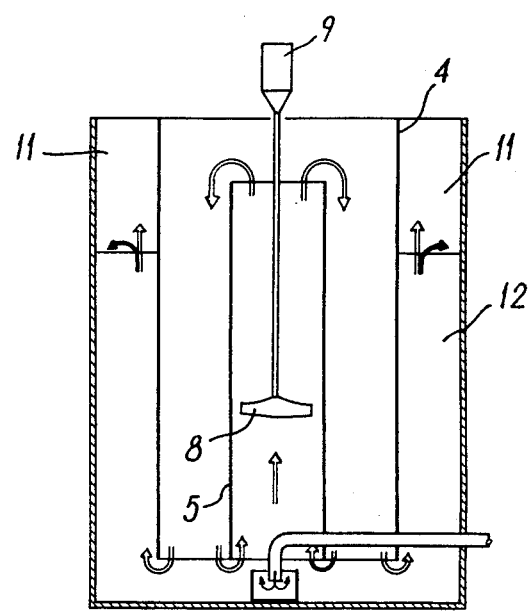
FIG. 2 is a sectional view taken along line II—II of FIG. 1.

The drawings illustrate an apparatus according to the present invention, and including a single enclosure having therein three tanks or areas, namely a reaction tank indicated generally at 1, a lamella settling tank indicated generally at 21, and an intermediate concentrating or thickening tank 10 positioned between tanks 1 and 21. In the drawings the light arrows indicate the flow of water, and the dark arrows indicate the flow of sludge.

The reaction tank 1 includes a first or central zone 2 for receiving the water to be treated and for achieving mixing of such water with recycled sludge, and a second zone in the form of compartments 3 on opposite sides of the first central zone 2 for flocculating or crystalline precipitating sludge from the water. Compartments 3 are connected at upper portions thereof to concentrating tank 10 to transfer thereto the water and flocculated or precipitated sludge. The first zone 2 is defined by two coaxial enclosure members including an inner cylindrical member 5 and an outer coaxially arranged member 4 of parallelepipedel shape.

The water to be treated, admixed with recycled sludge in the manner described below, and to which may be added conventional reagents employed in the treatment, is introduced through conduit 6 into a lower portion of inner cylindrical member 5. An additive, for example a polymer of known type, may be introduced into member 5 as by conduit 7. An impeller or turbine 8 is positioned within inner cylindrical member 5 to induce a flow of water to be treated and recycled sludge, as well as possible added reagents, upwardly through the inner cylindrical member 5 and then downwardly through a space between inner and outer members 5, 4, as indicated by the arrows. This circulation is a very strong flow of the liquor, preferably on the order of from two to ten times the rate of introduction into the inner cylindrical member of the water to be treated. Thus, a strong recirculation is created between the two enclosures or members to ensure mixing and intimate contact between the water, the reagents and the recycled sludge.

From the outer enclosure or member 4 the water-sludge mixture is passed into the compartments 3 and flows upwardly therethrough. During this time the particles and matter flocculate with the previously recycled sludge to enable the formation of thick, dense floccules. The water and the thus forming floccules, or crystalline precipitates, move upwardly slowly through the compartments 3. Upper portions of compartments 3 communicate with concentrating tank 10 by orifices 11 defined by overflow weirs at the upper part of a partition 12 which separates reaction tank 1 from concentrating tank 10. The water and floccules overflow these weirs through orifices 11 into concentrating tank 10. The floccules settle downwardly, while the water passes generally horizontally across intermediate concentrating tank 10.

The floccules of sludge move downwardly through intermediate concentrating tank 10 and therein are thickened or concentrated. For this purpose, tank 10 is equipped with a cylindrical-conical sludge collector 13 provided with a scraper 14 and a rake 15 driven by a power unit 16 for promoting thickening or concentrating of settled sludge. A conduit 17 is provided at the base of collector 13 and serves for the discharge of concentrated sludge from tank 10.

Additionally however in accordance with the present invention, there is provided an arrangement for recycling to reaction tank 1 a portion of the sludge from concentrating tank 10 prior to the maximum concentration therein of the sludge. Thus, a conduit 18 is provided at an intermediate height in tank 10 and extends to a recirculation device, for example a pump 19 provided on conduit 6 for supply of the water to be treated. The tank 10 has an upper zone for the generally horizontal passage therethrough of water from reaction zone 1 to lamella settling zone 21. Tank 10 also has a lower thickening zone, and conduit 18 extends into this zone at a level of from one-half to one-third of the height thereof. Thus, the sludge which is passed from the thickening zone and recycled to the reaction zone by conduit 18, pump 19 and conduit 6 is sludge which has not yet been concentrated or thickened to the maximum extent. In other words, conduit 18 does not lead from the bottom of collector 13 but is connected at an area above such bottom. Those skilled in the art will realize how this feature and concept of the invention may be varied.

The water which passes from reaction tank 1 through the upper zone of tank 10 enters an orifice or inlet 20 into lamella settling tank 21. This water will have removed therefrom prior to entry into inlet 20 85 to 90% of the suspended materials. In lamella settling tank 21 sedimentation of the remaining materials in the water is completed, the settled materials falling to the bottom of tank 21, and the treated water being collected in chutes 22 and then discharged as indicated by the arrow in FIG. 1. It is intended that the structure of the elements within lamella settling tank 21 be conventional lamella settling modules, as would be understood by one skilled in the art.

At the bottom of lamella settling tank 21 may be provided a scraper 23 for moving settled sludges into one or more collection and concentration pits 24. As seen in FIG. 1, tanks 10 and 21 are separated by a partition, with the exception of inlet 20. Concentrated sludge from pit 24 may be discharged therefrom by means of conduit 25. A conduit 26 controlled by a valve 28 may lead from conduit 25 for discharge of sludge. Also, conduit 25 includes a valve 27 downstream of conduit 26 for selective recycling of a portion of the sludge from pit 24 to pump 19, whereby some of this sludge also may be recycled to reaction tank 1.

Comparative tests were conducted on two devices having identical lamella settling surfaces and treating the same water, i.e. surface water, concurrently by the addition of the same amount of coagulating mineral reagent and polymer. One of these devices, i.e. apparatus 1, comprised a conventional internal sludge-recirculation system and the other device, i.e. apparatus 2, was a device according to the present invention. The following results were obtained:

|  | Apparatus 1 | Apparatus 2 |
| --- | --- | --- |
| Settling velocity in the lamella zone | 17 m/h | 35 m/h |
| Average percentage of suspended matter in the treated water | 4 mg/l | 3.6 mg/l |
| Average concentration of the withdrawn sludges | 19 g/l | 60 g/l |

Thus, it will be seen that the present invention provides an apparatus whereby it is possible to achieve increased velocity of settling, decreased average percentage of suspended matter in the treated water, and increased thickening or concentration of sludge.

Although the present invention has been described and illustrated with respect to a preferred embodiment thereof, it is to be understood that various changes and modifications as will be apparent to those skilled in the art may be made without departing from the scope of the present invention.

We claim:

1. An apparatus for the treatment of water to remove colloidal and suspended matter therefrom by flocculation and/or crystalline precipitation, settling of resultant sludge and recycling of at least a portion of the thus concentrated sludge to the incoming water to be treated, said apparatus comprising:

reaction tank means for receiving water to be treated and for forming sludge of flocculated or crystalline precipitated matter contained in the water, said reaction tank means comprising a first zone for receiving the water to be treated and for achieving mixing of the water with the recycled sludge, and a second zone connected to said first zone for flocculating or crystalline precipitating sludge from the water, said second zone being connected to said concentrating tank, means for transferring thereto the water and sludge, wherein said first zone is defined by two coaxial enclosure members, said second zone comprises compartments on opposite sides of said first zone, said first and second zones are connected at adjacent lower ends thereof, and said compartments are connected at upper ends thereof to said concentrating tank means;

means for introducing into said reaction tank means the water to be treated;

concentrating tank means for receiving said water and sludge from said reaction tank means, for removing a major portion of sludge and matter from said water, and for thickening and concentrating said sludge, said concentrating tank means including a sludge collector for promoting the concentrating of settled sludge;

lamella settling tank means for receiving from said concentrating tank means said water and for removing therefrom by settling remaining sludge and matter, said lamella settling tank means including at least one pit for the collection of sludge, and means for withdrawing sludge from said pit;

means for removing treated water from said lamella settling tank means;

means for recycling to said reaction tank means a portion of the sludge from said concentrating tank means prior to the maximum concentration therein of said sludge;

means for removing concentrated sludge from said concentrating tank means; and a single enclosure containing therein said reaction tank means, said concentrating tank means and said lamella settling tank means, with said concentrating tank means being positioned between said reaction tank means and said lamella settling tank means.

2. An apparatus as claimed in claim 1, wherein said two enclosure members comprise an inner cylindrical member and an outer member of parallelepipedal shape.

3. An apparatus as claimed in claim 2, wherein said means for introducing the water to be treated and said means for recycling said portion of said sludge are connected to a lower portion of said inner cylindrical member.

4. An apparatus as claimed in claim 3, further comprising impeller means within said inner cylindrical member for inducing a flow of the water to be treated and the recycled sludge upwardly through said inner cylindrical member and downwardly through a space between said inner and outer members, at a rate of flow several times faster than the rate of introduction into said inner cylindrical member of the water to be treated and the recycled sludge, thereby providing a strong circulation of the water-recycled mixture between said two enclosure members.

5. An apparatus as claimed in claim 1, further comprising overflow weirs between said compartments and said concentrating tank means.

6. An apparatus as claimed in claim 1, wherein said collector comprises a downwardly converging conical member equipped with a scraper and a rake.

7. An apparatus as claimed in claim 1, wherein said recycling means comprises a conduit extending from said concentrating tank means, at a position from one-third to one-half of the height thereof from the bottom thereof.

8. An apparatus as claimed in claim 7, wherein said conduit is connected to said supplying means.

9. An apparatus as claimed in claim 1, further comprising means for recycling at least a portion of the sludge withdrawn from said pit to said reaction tank means.

* * * * *